(12) United States Patent
Funada

(10) Patent No.: US 8,487,925 B2
(45) Date of Patent: Jul. 16, 2013

(54) DISPLAY APPARATUS, METHOD AND COMPUTER READABLE MEDIUM THAT AVOIDS FAILURE IN AN AUTOMATIC ADJUSTMENT OF AN EFFECTIVE IMAGE AREA AND DOT CLOCK

(75) Inventor: Masahiro Funada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 676 days.

(21) Appl. No.: 12/410,240

(22) Filed: Mar. 24, 2009

(65) Prior Publication Data

US 2009/0295781 A1 Dec. 3, 2009

(30) Foreign Application Priority Data

Jun. 2, 2008 (JP) ................... 2008-144341

(51) Int. Cl.
*G09G 5/12* (2006.01)
*H30L 7/00* (2006.01)

(52) U.S. Cl.
USPC .......................................... 345/213; 348/537

(58) Field of Classification Search
None
See application file for complete search history.

(56) References Cited

U.S. PATENT DOCUMENTS

| | | | | |
|---|---|---|---|---|
| 5,416,510 A | * | 5/1995 | Lipton et al. | 348/43 |
| 6,057,809 A | * | 5/2000 | Singhal et al. | 345/3.3 |
| 6,091,386 A | * | 7/2000 | Bassetti et al. | 345/87 |
| 6,181,313 B1 | * | 1/2001 | Yokota et al. | 345/100 |
| 6,804,024 B1 | * | 10/2004 | Kizaki et al. | 358/1.18 |

FOREIGN PATENT DOCUMENTS

| | | |
|---|---|---|
| JP | 08-046809 A | 2/1996 |
| JP | 2000-347615 A | 12/2000 |
| JP | 2001-324952 A | 11/2001 |
| JP | 2006-065095 A | 3/2006 |

* cited by examiner

Primary Examiner — K. Wong
(74) Attorney, Agent, or Firm — Canon USA Inc IP Division

(57) ABSTRACT

When an image signal suitable for performing automatic adjustment of an effective image area and a dot clock is not output, the adjustment may be unsuccessfully performed. An effective image area detector detects an effective image area and determines whether an image in the effective image area is a blank image. If a synchronization signal detector determines that there exists a synchronization signal and if the effective image area detector determines that the image is not a blank image, a controller adjusts an area captured as image data by an input signal processor.

8 Claims, 4 Drawing Sheets

FIG. 2

| SIGNAL NAME | SIGNAL SIDn | HORIZONTAL SYNCHRONIZATION PERIOD HPtn [ns] | TOTAL NUMBER OF VERTICAL LINES VLtn [line] | TOTAL NUMBER OF HORIZONTAL DOTS HDtn [dot] | HORIZONTAL RESOLUTION HRtn [dot] | VERTICAL RESOLUTION VRtn [line] | HORIZONTAL START POSITION HStn [dot] | VERTICAL START POSITION VStn [line] |
|---|---|---|---|---|---|---|---|---|
| VGA01 | 0 | 31778 | 525 | 800 | 640 | 480 | 136 | 27 |
| SVGA01 | 1 | 26400 | 628 | 1056 | 800 | 600 | 216 | 27 |
| XGA01 | 2 | 20677 | 806 | 1344 | 1024 | 768 | 296 | 35 |
| WXGA01 | 3 | 21099 | 790 | 1440 | 1280 | 768 | 112 | 19 |
| SXGA01 | 4 | 15630 | 1066 | 1688 | 1280 | 1024 | 360 | 41 |
| SXGA+01 | 5 | 15310 | 1089 | 1864 | 1400 | 1050 | 376 | 36 |
| WSXGA01 | 6 | 17878 | 934 | 1904 | 1440 | 900 | 384 | 31 |
| UXGA01 | 7 | 13333 | 1250 | 2160 | 1600 | 1200 | 496 | 49 |

DISPLAY APPARATUS, METHOD AND COMPUTER READABLE MEDIUM THAT AVOIDS FAILURE IN AN AUTOMATIC ADJUSTMENT OF AN EFFECTIVE IMAGE AREA AND DOT CLOCK

BACKGROUND OF THE INVENTION

1. Field of the Invention

The present invention relates to a display apparatus. The display apparatus according to the present invention can be applied to a projection display apparatus and a liquid crystal display, such as a liquid crystal projector apparatus and a DMD (Digital Micromirror Device) projector apparatus.

2. Description of the Related Art

When analog image signals of documents or graphics created by a computer are displayed in a display apparatus, it is important to achieve matching of a dot clock of the image signals and an effective image area between the computer and the display apparatus. A typical display apparatus holds a signal format table that associates attributes including the frequency and polarity of horizontal and vertical synchronization signals with a dot clock and an effective image area and reads the attributes of the synchronization signal output from a computer, thereby determining a signal format.

However, the format of signals actually output from a computer has some deviations depending on the type of computer. For this reason, the display apparatus is demanded to have a function of automatically adjusting deviations in each type of computer, so that a technique of achieving the automatic adjustment based on information read from image signals has been developed.

For example, according to Japanese Patent Laid-Open No. 2001-324952, a unit of actually measuring a start position and resolution of horizontal and vertical effective areas is provided to automatically adjusting an effective image area and a dot clock. An image capturing area is corrected based on a measurement result of the start position obtained by this unit, and the dot clock is automatically adjusted so that the measurement result of horizontal resolution has a value equal to that in a signal format table.

Such an automatic adjustment is performed at the time when a synchronization signal is detected or when a user requests the adjustment. A correction value obtained as a result of the automatic adjustment is stored in a nonvolatile storage area. Furthermore, when another synchronization signal of the same attribute is input, the correction value stored in the nonvolatile storage area is used without another automatic adjustment.

The technique according to Japanese Patent Laid-Open No. 2001-324952 is based on the assumption that image signals are output to an entire effective image area output from a computer at the time of automatic adjustment of the effective image area and the dot clock. However, in some types of computer, output of a synchronization signal is immediately started but output of an image signal delays to some extent when output resolution is converted. When the display apparatus is connected to such a computer, the above-described automatic adjustment may be unsuccessfully performed if the adjustment is performed upon detection of a synchronization signal. Also, the adjustment may be unsuccessfully performed if an image using only part of the effective image area, such as in a DOS mode, is output from the computer.

SUMMARY OF THE INVENTION

The present invention provides a display apparatus capable of eventually avoiding failure in an automatic adjustment of an effective image area and a dot clock even if a desired image signal for performing the automatic adjustment is not output.

A display apparatus according to an embodiment of the present invention includes a synchronization signal detector configured to determine whether a synchronization signal exists; an AD converter configured to convert an analog image signal to a digital image signal; an effective image area detector configured to detect an effective image area and determine whether an image in the effective image area is a blank image based on the digital image signal output from the AD converter; an input signal processor configured to capture the digital image signal output from the AD converter as image data; and a controller configured to adjust an area captured as image data by the input signal processor based on the effective image area detected by the effective image area detector. The controller adjusts the area captured as image data by the input signal processor in the case where the synchronization signal detector determines that a synchronization signal exists and where the effective image area detector determines that the image is not the blank image.

Further features of the present invention will become apparent from the following description of exemplary embodiments with reference to the attached drawings.

BRIEF DESCRIPTION OF THE DRAWINGS

FIG. 2 illustrates a signal format table.

DESCRIPTION OF THE EMBODIMENTS

Hereinafter, a display apparatus according to embodiments of the present invention is described in detail with reference to the attached drawings.

Figure 1:
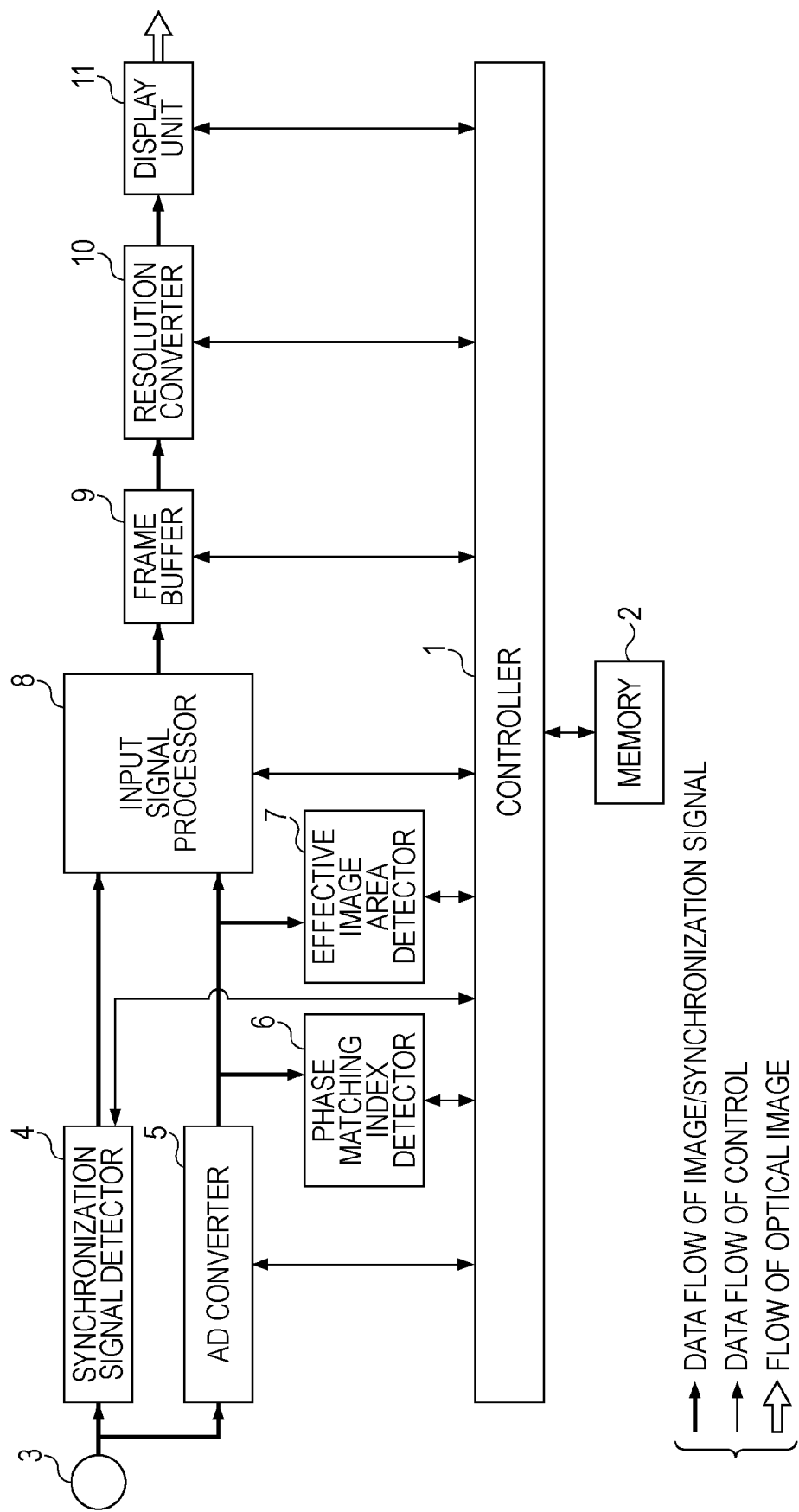
FIG. 1 is a block diagram illustrating a configuration of a projection display apparatus according to a first embodiment of the present invention.

FIG. 1 is a block diagram illustrating a configuration of a projection display apparatus according to a first embodiment. Referring to FIG. 1, a controller 1 controls respective units in the display apparatus in accordance with various programs stored in a memory 2. Although details are described below, the controller 1 also controls automatic adjustment of an image capturing area and a dot clock. The memory 2 also stores the signal format table illustrated in FIG. 2.

The signal format table shows signal type SIDn, horizontal synchronization period HPtn, total number of vertical lines VLtn, total number of horizontal dots HDtn, horizontal resolution HRtn, vertical resolution VRtn, horizontal start position HStn, and vertical start position VStn, which correspond to respective image signals. The total number of horizontal dots HDtn is the number of dots in one horizontal synchronization period.

A D-Sub15 pin terminal 3 is an input terminal for analog RGB signals of a computer or the like. That is, the D-Sub15 pin terminal 3 is a terminal to which analog image signals of different signal formats can be input.

A synchronization signal detector 4 determines whether a synchronization signal exists, detects the period of a horizontal synchronization signal and a count number of the horizontal synchronization signal in one period of a vertical synchronization signal (the number of vertical lines), and outputs the detected period and count number to the controller 1. Also, the synchronization signal detector 4 outputs an interrupt signal synchronizing the vertical synchronization signal to the controller 1.

An AD converter 5 performs AD conversion on an analog image signal in accordance with the total number of horizontal dots, the phase of the dot clock, offset, and gain set by the controller 1, and outputs a digital image signal. In this embodiment, the phase of the dot clock has eight stages of set values.

A phase matching index detector 6 detects a phase matching index PMIm based on the digital image signal output from the AD converter 5. The phase matching index PMIm is a value serving as an indicator to determine whether the total number of horizontal dots and the phase of the dot clock set in the AD converter 5 match the input image signal. Although a detailed description is omitted, the phase matching index PMIm is generated based on the degree of distribution of extracting a high-frequency component from the digital image signal. As the value of the phase matching index PMIm is larger, the degree of matching of the total number of horizontal dots and the phase of the dot clock to the image signal is higher.

An effective image area detector 7 detects a start position HSm and an end position HEm of a horizontal effective area and a start line VSm and an end line VEm of a vertical effective area based on the digital image signal output from the AD converter 5. The detection values monitor the output of the AD converter 5, define that a rectangle including all pixel coordinates indicating an output value exceeding a value specified by the controller 1 is an effective image area, and correspond to the four sides of the effective image area. The effective image area detector 7 sets a blank detection flag to an image signal in which a pixel exceeding the specified value does not exist in the effective image area. That is, the effective image area detector 7 functions also as a blank image determining unit.

An input signal processor 8 processes the digital image signal output from the AD converter 5 and captures pixel data of the area surrounded by horizontal and vertical capture start positions and horizontal and vertical capture widths as image data. The horizontal and vertical capture start positions are defined by the horizontal and vertical start positions set by the controller 1, whereas the horizontal and vertical capture widths are defined by the horizontal and vertical resolutions set by the controller 1. The captured image data is sequentially stored in a frame buffer 9.

The frame buffer 9 has a buffer function of respective pieces of pixel data of input image signals. A resolution converter 10 reads image data of the area set by the controller 1 from the frame buffer 9 and performs scale-up and scale-down on the image data. A display unit 11 converts image signals output from the resolution converter 10 to an optical image.

Although not illustrated in the figure, the projection display apparatus according to this embodiment further includes a projector to project the optical image generated through conversion in the display unit 11 onto a screen.

Next, a description is given about a method for deciding set values of the total number of horizontal dots and the phase of the dot clock in the AD converter 5 and the horizontal capture start position, the vertical capture start line, and the horizontal and vertical resolutions in the input signal processor 8.

Figure 3:
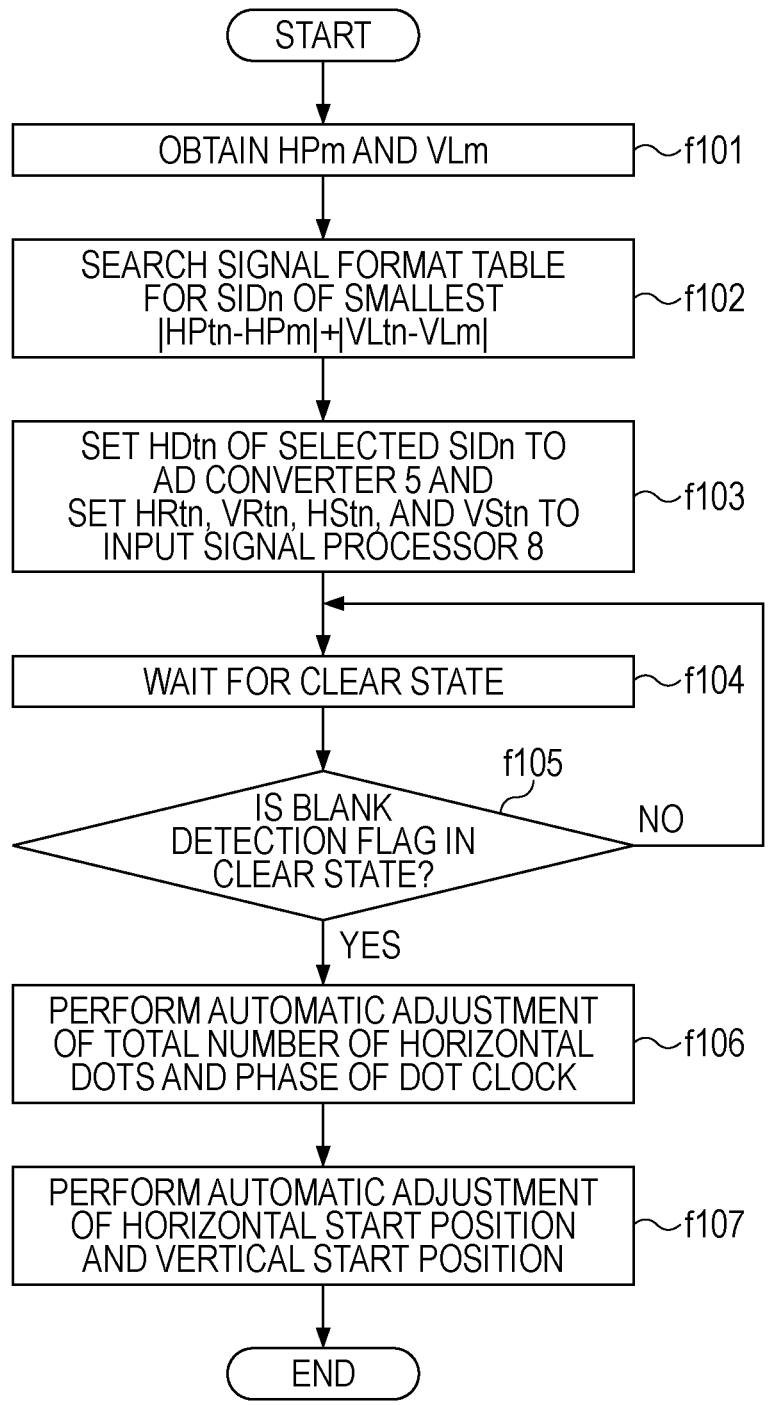
FIG. 3 is a flowchart illustrating setting of various parameters according to the first embodiment.

The method is described with reference to FIG. 3 based on the assumption that a start point is the state where a synchronization signal is detected by the synchronization signal detector 4.

First, in step f101, the synchronization signal detector 4 obtains a horizontal synchronization signal period HPm and the number of vertical lines VLm from an input image signal and outputs them to the controller 1.

In step f102, the controller 1 compares the horizontal synchronization signal period HPm and the number of vertical lines VLm obtained by the synchronization signal detector 4 with the horizontal synchronization signal period HPtn and the number of vertical lines VLtn of each signal timing in the signal format table (FIG. 2). Specifically, the controller 1 searches for a signal type SIDn of the smallest |HPtn−HPm|+|VLtn−VLm| and selects it as the most approximate signal type SIDn.

In step f103, the controller 1 sets the total number of horizontal dots HDtn of the selected signal type SIDn to the AD converter 5. Also, the controller 1 sets the horizontal resolution HRtn, the vertical resolution VRtn, the horizontal start position HStn, and the vertical start position VStn to the input signal processor 8.

In step f104, the controller 1 monitors the blank detection flag of the effective image area detector 7 and waits for a clear state at the timing of receiving an interrupt signal synchronizing the vertical synchronization signal output from the synchronization signal detector 4. If the clear state is determined in step f105, the controller 1 performs automatic adjustment of various parameters described below in step f106.

First, automatic adjustment of the total number of horizontal dots and the phase of the dot clock in step f106 is described in detail.

In step f106, the controller 1 sequentially sets all the 85 sets of combination of the phases of the dot clock in the range of −8 to +8 to the AD converter 5, with the total number of horizontal dots HDtn of the selected signal type SIDn being the reference. In the above-described respective sets, the controller 1 obtains the phase matching index PMIm from the phase matching index detector 6 and determines the total number of horizontal dots and the phase of the dot clock that cause the phase matching index PMIm to be maximum. Then, the controller 1 sets the determined total number of horizontal dots and phase of the dot clock, which are optimum values, to the AD converter 5.

Next, automatic adjustment of the horizontal start position and the vertical start position in step f107 is described.

In step f107, the effective image area detector 7 obtains the start position HSm and the end position HEm of the horizontal effective image area and the start line VSm and the end line VEm of the vertical effective image area from the digital image signal output from the AD converter 5. An optimum horizontal start position HSo is determined in the following expression (1), and an optimum vertical start position VSo is determined in the following expression (2).

$$HSo = HSm - \{HRtn - (HEm - HSm)\}/2 \tag{1}$$

$$VSo = VSm - \{VRtn - (VEm - VSm)\}/2 \tag{2}$$

In this way, the total number of horizontal dots, the phase of the dot clock, the horizontal start position, and the vertical start position are automatically adjusted. After the automatic adjustment has been completed, the resolution converter 10 and the display unit 12 are appropriately set, so that an image corresponding to input signals is displayed on the screen.

By performing the automatic adjustment of various parameters using the configuration and flow of this embodiment in the above-described manner, one of causes of failure in the adjustment can be eliminated because the end of the blank state is waited for if an image signal is in the blank state at detection of a synchronization signal. In this embodiment, the total number of horizontal dots, the phase of the dot clock, the horizontal start position, and the vertical start position are set as the parameters to be automatically adjusted. However, the scope of the present invention is not limited to this combination. Any one of the above-described parameters may be automatically adjusted.

Hereinafter, a display apparatus according to a second embodiment of the present invention is described. This embodiment is directed to further improving the convenience in view of the case where an image signal output device outputs an image to part of the effective image area in the DOS mode or the like.

Figure 4:
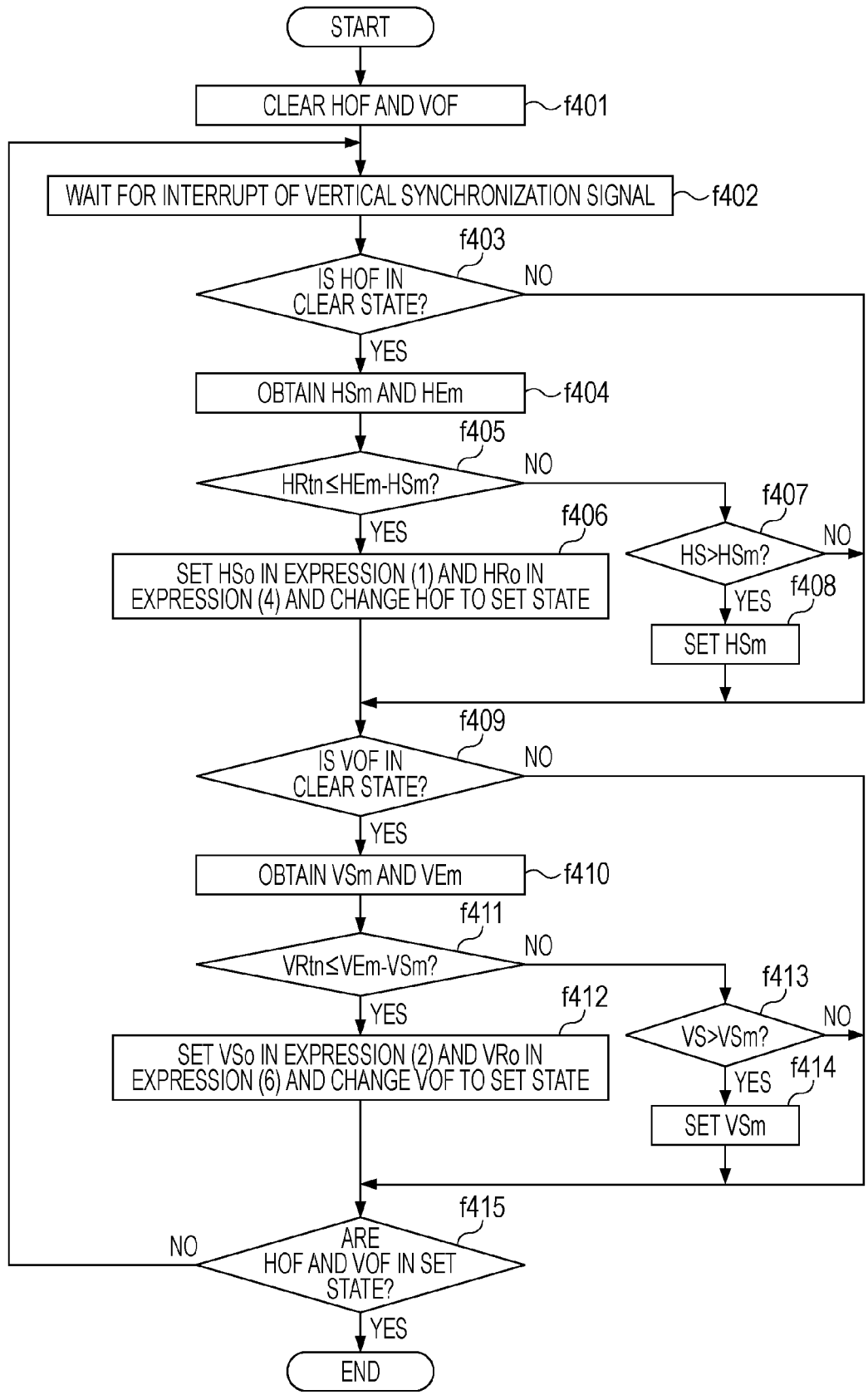
FIG. 4 is a flowchart illustrating automatic adjustment of horizontal and vertical start positions according to a second embodiment of the present invention.

The block configuration of the display apparatus according to this embodiment is the same as that in the first embodiment, and thus the description thereof is omitted. Also, determination of set values of the total number of horizontal dots, the phase of the dot clock, the horizontal start position, the vertical start position, the horizontal resolution, and the vertical resolution is the same as that in the first embodiment from steps f101 to f106 illustrated in FIG. 3, and thus the corresponding description is omitted. This embodiment is different from the first embodiment in the automatic adjustment of the horizontal and vertical start positions in step f107 illustrated in FIG. 3. Hereinafter, the automatic adjustment of the horizontal and vertical start positions different from that in the first embodiment is described with reference to FIG. 4.

First, in step f401, the controller 1 defines a horizontal-direction automatic adjustment end flag HOF and a vertical-direction automatic adjustment end flag VOF, which are variables, in the memory 2, and sets HOF and VOF to a clear state.

In step f402, the controller 1 waits for occurrence of interrupt of a vertical synchronization signal from the synchronization signal detector 4.

If it is determined in step f403 that the horizontal-direction automatic adjustment end flag HOF is in the clear state, the process proceeds to step f404. If the flag HOF is in the set state, the process proceeds to step f409.

In step f404, the effective image area detector 7 obtains the start position HSm and the end position HEm of the horizontal effective image area from the image signal. In step f405, if the relationship between the difference between the horizontal end position HEm and the horizontal start position HSm and the horizontal resolution HRtn of the selected signal type SIDn satisfies the following expression (3), the process proceeds to step f406. If the relationship does not satisfy expression (3), the process proceeds to step f407.

$$HRtn \leq HEm - HSm \quad (3)$$

In step f406, the controller 1 sets the optimum horizontal resolution HRo and the optimum horizontal start position HSo to the values obtained from the following expression (4) and the above expression (1), respectively, and sets the values to the input signal processor 8. Furthermore, the controller 1 changes the horizontal-direction automatic adjustment end flag HOF to the set state.

$$HRo = HEm - HSm \quad (4)$$

In step f407, the controller 1 compares the set value HS of the current horizontal start position of the input signal processor 8 with the horizontal start position HSm obtained in step f404. If HS>HSm is satisfied, the process proceeds to step f408, where the controller 1 sets HSm to the input signal processor 8. Otherwise, the current value is maintained and the process proceeds to step f409.

In step f409, if the vertical-direction automatic adjustment flag VOF is in the clear state, the process proceeds to step f410. If the flag VOF is in the set state, the process proceeds to step f415.

In step f410, the effective image area detector 7 obtains the start line VSm and the end line VEm of the vertical effective image area from the image signal. In step f411, if the relationship between the difference between the vertical end line VEm and the vertical start line VSm and the vertical resolution VRtn of the selected signal type SIDn satisfies the following expression (5), the process proceeds to step f412. If the relationship does not satisfy expression (5), the process proceeds to step f413.

$$VRtn \leq VEm - VSm \quad (5)$$

In step f412, the controller 1 sets the optimum vertical resolution VRo and the optimum vertical start position VSo to the values obtained from the following expression (6) and the above expression (2), respectively, and sets the values to the input signal processor 8. Furthermore, the controller 1 changes the vertical-direction automatic adjustment end flag VOF to the set state.

$$VRo = VEm - VSm \quad (6)$$

In step f413, the controller 1 compares the set value VS of the current vertical start position of the input signal processor 8 with the vertical start position VSm obtained in step f410. If VS>VSm is satisfied, the process proceeds to step f414, where the controller 1 sets VSm to the input signal processor 8. Otherwise, the current value is maintained and the process proceeds to step f415.

If both the horizontal-direction automatic adjustment end flag HOF and the vertical-direction automatic adjustment end flag VOF are in the set state, it is determined that the automatic adjustment has been completed and the process ends. If any one of the flags HOF and VOF is in the clear state, the process returns to step f402 and the automatic adjustment is performed again.

Although not described for simplification of the flow, the resolution converter 10 and the display unit 12 in the subsequent stage may be appropriately set so that an image corresponding to the input signal is displayed on the screen at the time of step f415.

As described above, even if automatic adjustment is started in the state where the image signal output device outputs an image only to part of the effective image area as in the DOS mode, the automatic adjustment is periodically performed until an end condition is satisfied. Thus, the automatic adjustment can be continued even if the image area is extended.

Although not clearly described in this embodiment, the variables: horizontal-direction automatic adjustment end flag HOF and vertical-direction automatic adjustment end flag VOF may be held in a nonvolatile memory. In that case, HOF and VOF are associated with the measured horizontal synchronization period HPtn and vertical line VLtn and are held in the nonvolatile memory together with the respective parameters set to the input signal processor 4, whereby the original set values can be restored at next startup after the power of the display apparatus is turned off. Accordingly, once automatically adjusted, the signal format does not require automatic adjustment at next connection. Also, even if the power is turned off during automatic adjustment of the signal format, the process can be continued after next startup, and thus the steps in the process can be reduced.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions. For example, a projection display apparatus is used as an example in the first and second embodiments, but the thoughts of the present invention can be applied to other types of display apparatuses, such as a direct-view liquid crystal display.

This application claims the benefit of Japanese Patent Application No. 2008-144341 filed Jun. 2, 2008, which is hereby incorporated by reference herein in its entirety.

What is claimed is:

1. A display apparatus comprising:
a synchronization signal detector configured to determine whether a synchronization signal exists;
an AD converter configured to convert an analog image signal to a digital image signal;
an effective image area detector configured to determine whether an image is a blank image based on the digital image signal output from the AD converter and detect an effective image area in a case where the effective image area detector determines that the image is not a blank image;
an input signal processor configured to capture the digital image signal output from the AD converter as image data; and
a controller configured to adjust an area captured as image data by the input signal processor based on the effective image area detected by the effective image area detector in the case where the synchronization signal detector determines that a synchronization signal exists and where the effective image area detector determines that the image is not the blank image.

2. A display apparatus comprising:
a synchronization signal detector configured to determine whether a synchronization signal exists;
an AD converter configured to convert an analog image signal to a digital image signal;
a blank image determining unit configured to determine whether an image is a blank image based on the digital image signal output from the AD converter; and
a controller configured to adjust a phase of a dot clock of the AD converter in the case where the synchronization signal detector determines that a synchronization signal exists and where blank image determining unit determines that the image is not the blank image.

3. The display apparatus according to claim 1,
wherein the effective image area detector sets a blank detection flag in a clear state in a case where there is a value output from the AD converter that exceeds a threshold in a frame, and
wherein the controller adjusts the area in a case where the blank detection flag is in the clear state.

4. The display apparatus according to claim 1, wherein the effective image area includes all pixel coordinates indicating the value output from the AD converter that exceeds the threshold.

5. The display apparatus according to claim 1,
wherein the synchronization signal detector detects a period of a horizontal synchronization signal and the number of vertical lines,
wherein the effective image area detector obtains a start position and an end position of a horizontal effective image area from the digital image signal output from the AD converter,
wherein the controller selects a signal type based on the period of the horizontal synchronization signal and the number of vertical lines,
wherein, in a case where a difference between the end position and the start position of the horizontal effective image area is equal to or larger than a horizontal resolution of the selected signal type, the controller sets the difference as an optimum horizontal resolution and changes a horizontal-direction automatic adjustment end flag into a set state,
wherein, in a case where the horizontal-direction automatic adjustment end flag is in the set state, the controller ends adjusting the area,
wherein the input signal processor captures image data based on the optimum horizontal resolution, and
wherein, in a case where the horizontal-direction automatic adjustment end flag is not in the set state, the controller adjusts the area again.

6. The display apparatus according to claim 1,
wherein the synchronization signal detector detects a period of a horizontal synchronization signal and the number of vertical lines,
wherein the effective image area detector obtains a start line and an end line of a vertical effective image area from the digital image signal output from the AD converter,
wherein the controller selects a signal type based on the period of the horizontal synchronization signal and the number of vertical lines,
wherein, in a case where a difference between the end line and the start line of the vertical effective image area is equal to or larger than a vertical resolution of the selected signal type, the controller sets the difference as an optimum vertical resolution and changes a vertical-direction automatic adjustment end flag into a set state,
wherein, in a case where the vertical-direction automatic adjustment end flag is in the set state, the controller ends adjusting the area,
wherein the input signal processor captures image data based on the optimum vertical resolution, and
wherein, in a case where the vertical-direction automatic adjustment end flag is not in the set state, the controller adjusts the area again.

7. A non-transitory computer-readable storage medium storing a process for causing a display apparatus comprising a synchronization signal detector configured to determine whether a synchronization signal exists, an AD converter configured to convert an analog image signal to a digital image signal, and an input signal processor configured to capture the digital image signal output from the AD converter as image data, to execute the steps of:
determining whether an image is a blank image based on the digital image signal output from the AD converter and detecting an effective image area in a case where it is determined that the image is not a blank image; and
adjusting an area captured as image data by the input signal processor based on the effective image area detected in the effective image area detecting step in the case where the synchronization signal detector determines that a synchronization signal exists and where it is determined in the effective image area detecting step that the image is not the blank image.

8. A method comprising the steps of:
determining whether an image is a blank image based on the digital image signal output from an AD converter and detecting an effective image area in a case where it is determined that the image is not a blank image; and
adjusting an area captured as image data based on the effective image area detected in the effective image area detecting step in the case where it is determined that a synchronization signal exists and where it is determined in the effective image area detecting step that the image is not the blank image.

* * * * *